United States Patent
Steinert et al.

(10) Patent No.: US 10,253,400 B2
(45) Date of Patent: Apr. 9, 2019

(54) HEAT-RESISTANT BEARING MATERIAL MADE OF AN AUSTENITIC IRON MATRIX ALLOY

(71) Applicant: Mahle International GmbH, Stuttgart (DE)

(72) Inventors: Lutz Steinert, Schopfheim (DE); Klaus Wintrich, Schopfheim (DE)

(73) Assignee: Mahle International GmbH (DE)

(*) Notice: Subject to any disclaimer, the term of this patent is extended or adjusted under 35 U.S.C. 154(b) by 0 days.

(21) Appl. No.: 14/382,833

(22) PCT Filed: Mar. 1, 2013

(86) PCT No.: PCT/EP2013/054130
§ 371 (c)(1),
(2) Date: Sep. 4, 2014

(87) PCT Pub. No.: WO2013/131811
PCT Pub. Date: Sep. 12, 2013

(65) Prior Publication Data
US 2015/0086411 A1 Mar. 26, 2015

(30) Foreign Application Priority Data

Mar. 7, 2012 (DE) .......... 10 2012 203 569

(51) Int. Cl.
| C22C 38/60 | (2006.01) |
| C22C 38/42 | (2006.01) |
| C22C 38/44 | (2006.01) |
| C22C 38/48 | (2006.01) |
| F16C 33/12 | (2006.01) |
| C22C 38/00 | (2006.01) |
| C22C 38/04 | (2006.01) |
| C22C 38/34 | (2006.01) |
| C22C 38/46 | (2006.01) |
| C22C 38/50 | (2006.01) |
| C22C 38/52 | (2006.01) |
| C22C 38/02 | (2006.01) |

(52) U.S. Cl.
CPC ............ *C22C 38/60* (2013.01); *C22C 38/001* (2013.01); *C22C 38/002* (2013.01); *C22C 38/02* (2013.01); *C22C 38/04* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *F16C 33/121* (2013.01); *C21D 2211/003* (2013.01); *F16C 2204/66* (2013.01); *F16C 2300/54* (2013.01); *F16C 2360/22* (2013.01)

(58) Field of Classification Search
CPC ......... C22C 38/60; C22C 38/48; C22C 38/44; C22C 38/42; C22C 38/04; C22C 38/02; C22C 38/001
See application file for complete search history.

(56) References Cited

U.S. PATENT DOCUMENTS

| 4,434,006 A | * | 2/1984 | Kato | ............... C22C 38/60 420/11 |
| 5,246,661 A | * | 9/1993 | Culling | .................. 420/12 |
| 5,326,526 A | * | 7/1994 | Ikenoue et al. | ............. 419/38 |
| 7,875,128 B2 | * | 1/2011 | Kuroda et al. | ............. 148/232 |

FOREIGN PATENT DOCUMENTS

| DE | 934836 C | 11/1955 | | |
| DE | 102009013506 A1 | * | 9/2010 | ......... C22C 38/38 |
| EP | 1352983 A1 | 10/2003 | | |
| EP | 1741799 A1 | 1/2007 | | |
| EP | 2029786 A1 | 3/2009 | | |
| JP | 54096418 A | * | 7/1979 | ......... C22C 38/48 |
| JP | S5496418 A | 7/1979 | | |
| WO | WO-2007147710 A1 | 12/2007 | | |

OTHER PUBLICATIONS

German Search Report for DE-102012203569.9, dated Apr. 2, 2012.
Japanese Office Action for Application No. 2014-560313, dated Feb. 10, 2015, 13 pp.
English Abstract for JP S5496418A.

* cited by examiner

*Primary Examiner* — Christopher S Kessler
(74) *Attorney, Agent, or Firm* — Fishman Stewart PLLC

(57) ABSTRACT

A heat-resistant bearing material may include an austenitic iron matrix alloy having a proportion of sulphur sufficient to achieve a solid lubricating action on bearing surfaces of the heat-resistant bearing material. The iron matrix alloy may have a proportion of carbides to achieve a reduction of wear on bearing surfaces of the heat-resistant bearing material and a proportion of 1 to 6 percentage by weight of at least one alloying element including cobalt, niobium, rhenium, tantalum, vanadium, tungsten, hafnium, yttrium and zirconium. The iron matrix alloy may also include the following alloying elements: carbon, chromium, manganese, silicon, nickel, molybdenum, niobium, tungsten, sulphur, copper, nitrogen and iron.

15 Claims, No Drawings

HEAT-RESISTANT BEARING MATERIAL MADE OF AN AUSTENITIC IRON MATRIX ALLOY

CROSS-REFERENCE TO RELATED APPLICATIONS

This application claims priority to International Patent Application PCT/EP2013/054130 filed Mar. 1, 2013, and German Patent Application No. 10 2012 203 569.9 filed Mar. 7, 2012, the contents of which are hereby incorporated by reference in their entirety.

TECHNICAL FIELD

The invention relates to a heat-resistant bearing material made from an austenitic iron matrix alloy with a proportion of sulphur sufficient for achieving a solid lubricating action on the bearing surfaces thereof, a proportion of carbides for achieving a reduction of wear on the bearing surfaces thereof, and a proportion of 1 to 6% by weight of one or more of the alloying elements cobalt (Co), niobium (Nb), rhenium (Re), tantalum (Ta), vanadium (V), tungsten (W), hafnium (Hf), yttrium (Y), zirconium (Zr) in accordance with the preamble of claim 1.

BACKGROUND

High-performance materials, particularly materials for bearing elements, such are used in turbochargers or exhaust gas recirculation systems for regulating flow in internal combustion engines for example, are known from the prior art. Various concepts are used, by which corresponding regulation systems are adjusted mechanically by externally positioned electric or pneumatic actuators using rod kinematics.

The penetration into the interior of the turbocharger or the exhaust gas recirculation system usually serves as the bearing for the adjustment as well. The bearing elements are in direct contact with the exhaust gas, with the result that temperatures on the bearing elements can reach as high as 950° C. Besides the high temperature load, the tribology and corrosion are also important as boundary conditions for the bearing elements.

With regard to tribological wear behaviour, the suitability of the material combination of the control system (shaft) and of the bearing material is of importance. Accordingly, different types of wear may occur, particularly adhesive or abrasive wear, tribochemical reaction wear or material fatigue. It is noticeable that in some material combinations the wearing effect decreases as the temperature rises. The oxide layers that are formed act as barrier layers, thereby preventing metallic contact between the tribological partners, which particularly reduces adhesive wear.

Furthermore, bearing elements in turbochargers and exhaust gas recirculation systems are exposed to environmental influences of varying severity depending on how they are installed in the engine compartment. In this context, corrosive phenomena play an important part. In particular, splashwater from the road, which in winter often contains road salt residues, can cause damage to surfaces. Besides these environmental and ambient sources of corrosive attack, exhaust gas condensates have been found to be the cause of corrosion more and more often in recent times. In particular, the use of exhaust gas recirculation systems has resulted in the increased incidence of corrosion by exhaust gas condensates. After the engine is stopped, localised condensation accumulates and is converted into hydrochloric, nitric or sulphuric acid by the chlorides and the nitrogen- or sulphur-bearing oxides in the atmosphere.

WO 2007/147710 A1 discloses a heat-resistant bearing material produced from an austenitic iron matrix alloy with a proportion of sulphur sufficient for achieving a solid lubricating action on the bearing surfaces thereof, and a proportion of 1 to 6% by weight of one or more of the alloying elements tungsten (W), cobalt (Co), niobium (Nb), rhenium (Re), molybdenum (Mo), tantalum (Ta), vanadium (V), hafnium (Hf), yttrium (Y), zirconium (Zr) and/or alloying elements having comparably high melting points. This material is used advantageously as a bearing material in turbochargers in combination with petrol engines due to the effective lubricating action of the sulphides together with the austenitic matrix and the good resistance thereof to creep, corrosion and oxidation. The disadvantage of this bearing material is that it is designed to be functionally reliable when used at high temperatures, preferably at temperatures above 600° C., and more preferably at temperatures above 850° C. This means that the properties of this material are most functionally effective at high temperature. On the other hand, in a temperature range below 400° C., such bearing materials are subject to greater wear.

SUMMARY

The object of the present invention is to provide a bearing material, particularly for turbochargers and exhaust gas recirculation systems, that has the require properties, particularly low susceptibility to wear, in the high temperature range, that is to say up to 950° C., and also in a temperature range below 400° C.

This object is solved with a heat-resistant bearing material made of an austenitic iron matrix alloy with a proportion of sulphur sufficient for achieving a solid lubricating action on the bearing surfaces thereof, a proportion of carbides for achieving a reduction of wear on the bearing surfaces thereof, and a proportion of 1 to 6% by weight of one or more of the alloying elements cobalt (Co), niobium (Nb), rhenium (Re), tantalum (Ta), vanadium (V), tungsten (W), hafnium (Hf), yttrium (Y), zirconium (Zr), which is characterised by the following additional alloying elements, with the respective percentages by weight: carbon (C)=0.8 to 1.5; chromium (Cr)=20-32; manganese (Mn)=0-1.0; silicon (Si)=1.5-3.5; nickel (Ni)=12-25; molybdenum (Mo)=0.5 to 5.5; niobium (Nb)=0-3.5; tungsten (W)=1.0-6.5, sulphur (S)=0.15-0.5; copper (Cu)=0-3.5; nitrogen (N)=0-0.8, and iron (Fe) the remainder including unavoidable impurities.

Surprisingly, the bearing material according to the invention embodies all of the required properties, namely that this material is subject only to very low wear against various counter-rotating materials both in the high temperature range, at temperatures above 850° C., and in the lower temperature range, i.e. at temperatures <400° C. The bearing materials used previously were developed mainly with a view to their effectiveness in the high-temperature range, and consequently wear could be greater in the lower temperature range.

The invention is based on the general idea of providing a proportion of sulphur in such a quantity as is able to form sulphide particles in the alloy that are necessary for the lubricating effect, and providing a proportion of carbon in such a quantity as is able to form the carbides in the alloy that are necessary for wear reduction effect. Carbon as an alloy component is precipitated as fine carbon particles, at the same time improving the solid lubrication properties thereof, or it functions as an auxiliary material in forming carbides or intermetallic compounds between iron and an alloying element, thereby improving wear resistance in an iron matrix.

With the inventive combination of an austenitic matrix with sulphide-based solid lubricant particles and a wear-resistant phase formed by carbides, it has proven possible to improve wear resistance in the lower temperature range significantly, without thereby sacrificing good wear and creep properties in the upper temperature range.

The addition of carbon result in the formation of carbides, which then function as a type of hard phase to reduce wear in the lower temperature range up to about 450° C., as is common in valve seat rings, for example. Generally, however, such an addition of carbon also result in significant deterioration of the high-temperature properties in terms of strength and creep resistance. For example, none of the materials listed collectively as "heat-resistant steels (12a)" in the "Stahlschlüssel" [Key to steel] has a carbon content greater than 0.2% by weight. Consequently, such an addition of carbon to alloys that are used in the high temperature range runs counter to the conventional knowledge of the art and thus yields a surprising result that a person skilled in the art could not be expected to predict.

DETAILED DESCRIPTION

In a preferred embodiment, the proportion of sulphur is at least 0.2% by weight, and the proportion of carbon is at least 0.8% by weight and at most 2.0% by weight. In fact, the preferred carbides are advantageously formed in an iron matrix with a carbon content as low as 0.8% by weight, thereby improving the solid lubricating properties, wear resistance and mechanical strength. In contrast, when the carbon content is above 2.0% by weight, the martensitic microstructure increases, an excessive quantity of hard, brittle cementite ($Fe_3C$) is formed as well as excessive quantities of carbides, which are formed between the carbon and other alloy component, causing the iron matrix to become brittle.

The invention claimed is:

1. A bearing material, comprising: an austenitic iron matrix alloy having a proportion of sulphide-based solid lubricant particles to provide a solid lubricating action on bearing surfaces of the bearing material, a proportion of carbides to provide a reduction of wear on bearing surfaces of the bearing material, and a proportion of 1 to 6 percentage by weight of at least one alloying element including cobalt (Co), rhenium (Re), tantalum (Ta), vanadium (V), hafnium (Hf), yttrium (Y), and zirconium (Zr), wherein the iron matrix alloy in addition to the proportion of 1 to 6 percentage of the at least one alloying element further includes a composition of the following alloying elements, with respective percentages by weight: carbon (C)=0.8 to 2.0; chromium (Cr)=20-32; manganese (Mn)=0-1.0; silicon (Si)=1.5-3.5; nickel (Ni)=12-25; molybdenum (Mo)=0.5 to 5.5; niobium (Nb)=1-3.5; tungsten (W)=1.0-6.5, sulphur (S)=0.15-0.5; copper (Cu)=0-3.5; nitrogen (N)=0-0.8, and iron (Fe), the remainder including unavoidable impurities.

2. The bearing material according to claim 1, wherein the composition of alloying elements has the following respective percentages by weight: carbon (C)=0.9 to 1.4; chromium (Cr)=21-28; manganese (Mn)=0.1-1.0; silicon (Si)=2.0-3.5; nickel (Ni)=14-23; molybdenum (Mo)=1.5 to 3.5; niobium (Nb)=1.0-3.0; tungsten (W)=2.0-3.5; sulphur (S)=0.15-0.5; copper (Cu)=1.0-3.5; nitrogen (N)=0.1-0.8, and iron (Fe), the remainder including unavoidable impurities.

3. The bearing material according to claim 2, wherein the proportion of sulphur is at least 0.2 percentage by weight.

4. The bearing material according to claim 1, wherein the bearing material is disposed in at least one of a turbocharger and an exhaust gas recirculation system for regulating flow in an internal combustion engine.

5. The bearing material according to claim 1, wherein at least one of the proportion of sulphur is at least 0.2 percentage by weight and the proportion of manganese ranges from 0.1 to 1.0 percentage by weight.

6. The bearing material according to claim 1, wherein the proportion of carbon ranges from 0.9 to 1.4 percentage by weight.

7. The bearing material according to claim 1, wherein some of said carbon is precipitated as fine carbon particles in the austenitic iron matrix alloy.

8. A bearing element for at least one of a turbocharger and an exhaust gas recirculation system for regulating flow in an internal combustion engine, comprising:
a bearing material having an austenitic iron matrix alloy, the iron matrix alloy including:
a proportion of sulphide-based solid lubricant particles to provide a solid lubricating action on bearing surfaces of the bearing material;
a proportion of carbides to provide a reduction of wear on bearing surfaces of the bearing material;
a proportion of 1 to 6 percentage by weight of at least one alloying element including cobalt (Co), rhenium (Re), tantalum (Ta), vanadium (V), hafnium (Hf), yttrium (Y), and zirconium (Zr); and
wherein the iron matrix alloy in addition to the proportion of 1 to 6 percentage by weight of the at least one alloying element has the following composition of alloy elements by weight:
carbon=0.8 to 2.0;
chromium=20 to 32;
manganese=0 to 1.0;
silicon=1.5 to 3.5;
nickel=12 to 25;
molybdenum=0.5 to 5.5;
niobium=1 to 3.5;
tungsten=1.0 to 6.5;
sulphur=0.15 to 0.5;
copper=0 to 3.5;
nitrogen=0 to 0.8; and
iron with a remainder including unavoidable impurities.

9. The bearing element according to claim 8, wherein the composition of the alloying elements has the following percentages by weight:
carbon=0.9 to 1.4
chromium=21 to 28;
manganese=0.1 to 1.0;
silicon=2.0 to 3.5;
nickel=14 to 23;
molybdenum=1.5 to 3.5;
niobium=1.0 to 3.0;
tungsten=2.0 to 3.5;
sulphur=0.15 to 0.5;
copper=1.0 to 3.5;
nitrogen=0.1 to 0.8; and
iron with a remainder including unavoidable impurities.

10. The bearing element according to claim 9, wherein the proportion of sulphur is at least 0.2 percentage by weight.

11. The bearing element according to claim 8, wherein the proportion of sulphur is at least 0.2 percentage by weight.

12. The bearing element according to claim 8, wherein the proportion of carbon ranges from 0.9 to 1.4 percentage by weight.

13. The bearing element according to claim 8, wherein some of said carbon is precipitated as fine carbon particles in the iron matrix alloy.

14. A bearing material, comprising:
an austenitic iron matrix alloy consisting of:
a proportion of sulphide-based solid lubricants;
a proportion of carbides;
at least one alloying element including cobalt, rhenium, tantalum, vanadium, hafnium, yttrium and zirconium having a cumulative weight percentage of 1 to 6; and
a composition of the following alloying elements in addition to the at least one alloying element:
carbon: 0.9 to 1.4 wt. %;
chromium: 21 to 28 wt. %;
manganese: 0.1 to 1.0 wt. %;
silicon: 2.0 to 3.5 wt. %;
nickel: 14 to 23 wt. %;
molybdenum: 1.5 to 3.5 wt. %;
niobium: 1.0 to 3.0 wt. %;
tungsten: 2.0 to 3.5 wt. %;
sulphur: 0.15 to 0.5 wt. %;
copper: 1.0 to 3.5 wt. %;
nitrogen: 0.1 to 0.8 wt. %; and
iron with a remainder including unavoidable impurities.

15. The bearing material according to claim 14, wherein some of said carbon is precipitated as fine carbon particles in the austenitic iron matrix alloy.

\* \* \* \* \*